(12) United States Patent
Tellado et al.

(10) Patent No.: US 11,737,016 B2
(45) Date of Patent: *Aug. 22, 2023

(54) ACCESS POINT CONFIGURATION PARAMETER RECOMMENDATION BASED ON ACCESS POINT CLASSIFICATION

(71) Applicant: HEWLETT PACKARD ENTERPRISE DEVELOPMENT LP, Houston, TX (US)

(72) Inventors: Jose Tellado, Santa Clara, CA (US); Bernd Bandemer, Santa Clara, CA (US); Yusuke Sakamoto, Santa Clara, CA (US)

(73) Assignee: Hewlett Packard Enterprise Development LP, Spung, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/024,976

(22) Filed: Sep. 18, 2020

(65) Prior Publication Data

US 2021/0007046 A1 Jan. 7, 2021

Related U.S. Application Data

(63) Continuation of application No. 15/720,008, filed on Sep. 29, 2017, now Pat. No. 10,791,510.

(60) Provisional application No. 62/464,223, filed on Feb. 27, 2017.

(51) Int. Cl.
*H04W 48/20* (2009.01)
*H04L 47/2491* (2022.01)
*H04W 24/02* (2009.01)
*H04W 88/12* (2009.01)
*H04W 88/10* (2009.01)

(52) U.S. Cl.
CPC ......... *H04W 48/20* (2013.01); *H04L 47/2491* (2013.01); *H04W 24/02* (2013.01); *H04W 88/10* (2013.01); *H04W 88/12* (2013.01)

(58) Field of Classification Search
CPC ..... H04W 48/20; H04W 24/02; H04W 88/10; H04W 88/12; H04L 47/2491
See application file for complete search history.

(56) References Cited

U.S. PATENT DOCUMENTS

| 10,009,736 | B1 | 6/2018 | Chu et al. |
| 2006/0153153 | A1* | 7/2006 | Bhagwat ................. H04K 3/86 370/338 |
| 2006/0193284 | A1* | 8/2006 | Stieglitz ............. H04L 63/1408 370/242 |
| 2011/0013569 | A1 | 1/2011 | Scherzer et al. |
| 2013/0142183 | A1* | 6/2013 | Lee ....................... H04L 5/0057 455/517 |
| 2015/0271632 | A1 | 9/2015 | Venkatraman et al. |
| 2015/0341211 | A1* | 11/2015 | Saha ..................... H04W 88/08 709/221 |

(Continued)

*Primary Examiner* — Ivan O Latorre
(74) *Attorney, Agent, or Firm* — Hewlett Packard Enterprise Patent Department

(57) ABSTRACT

Some of examples disclosed herein relate to classifying access points (APs). Some of the example may enable automatically classifying a set of APs based on at least one AP attribute of each AP in the set of APs, determining, based on the automatic classification, that a subset of APs in the set of APs are classified into a same class; and automatically determining a recommended configuration setting for the subset of APs.

20 Claims, 10 Drawing Sheets

(56) References Cited

U.S. PATENT DOCUMENTS

| | | |
|---|---|---|
| 2016/0374112 A1 | 12/2016 | Asterjadhi |
| 2018/0115903 A1 | 4/2018 | Badic et al. |
| 2018/0220306 A1* | 8/2018 | Smyth .................. H04W 16/14 |
| 2019/0246293 A1* | 8/2019 | Halabian ............... H04W 80/02 |
| 2020/0314962 A1* | 10/2020 | Abou Saleh ...... H04W 74/0808 |

* cited by examiner

| Type of AP Attribute | AP Attribute | AP Attribute Description |
|---|---|---|
| Radio propagation | pl_exp-2g, pl_exp-5g | Path loss exponent for 2.4/5G |
| | rmse-2g, rmse-5g | Path loss exponent - goodness for fit |
| | cf_ratio-2g, cf_ratio-5g | Cross floor connection ratio |
| AP arrangement | ap_den | Density of APs on a floor |
| | ap_den_std | Std dev of AP density |
| | phy | 11n of 11ac AP |
| | aptype | Indoor or Outdoor AP |
| User behavior | sta_den | Station density at peak hour |
| | dwell_time_2g, dwell_time_5g | Time spent in 2.4 Ghz and 5 Ghz |
| | mobile ratio | Are devices static or mobile |
| Traffic characteristics | tx_rx_logmean | Average traffic (bytes/unit time) generated by device |
| | rx_ratio_mean | Ratio of uplink to total (uplink+downlink) traffic |
| | rx_vi_ratio, rx_vo_ratio<rx_bk_ratio | Ratio of uplink WWM priority access categories to total uplink in packets |

FIG. 5

Path loss exponent

Total traffic (log)

Class Labels

ACCESS POINT CONFIGURATION PARAMETER RECOMMENDATION BASED ON ACCESS POINT CLASSIFICATION

BACKGROUND

Access points (AP) may be configured with respect to their radio parameters, port operation parameters, regulatory domain parameters, Quality of Service (QoS) parameters, and/or other configuration parameters that are used to configure an AP.

BRIEF DESCRIPTION OF THE DRAWINGS

The following detailed description references the drawings, wherein:

FIG. 5 is a table depicting example AP attributes.

DETAILED DESCRIPTION

Figure 1:
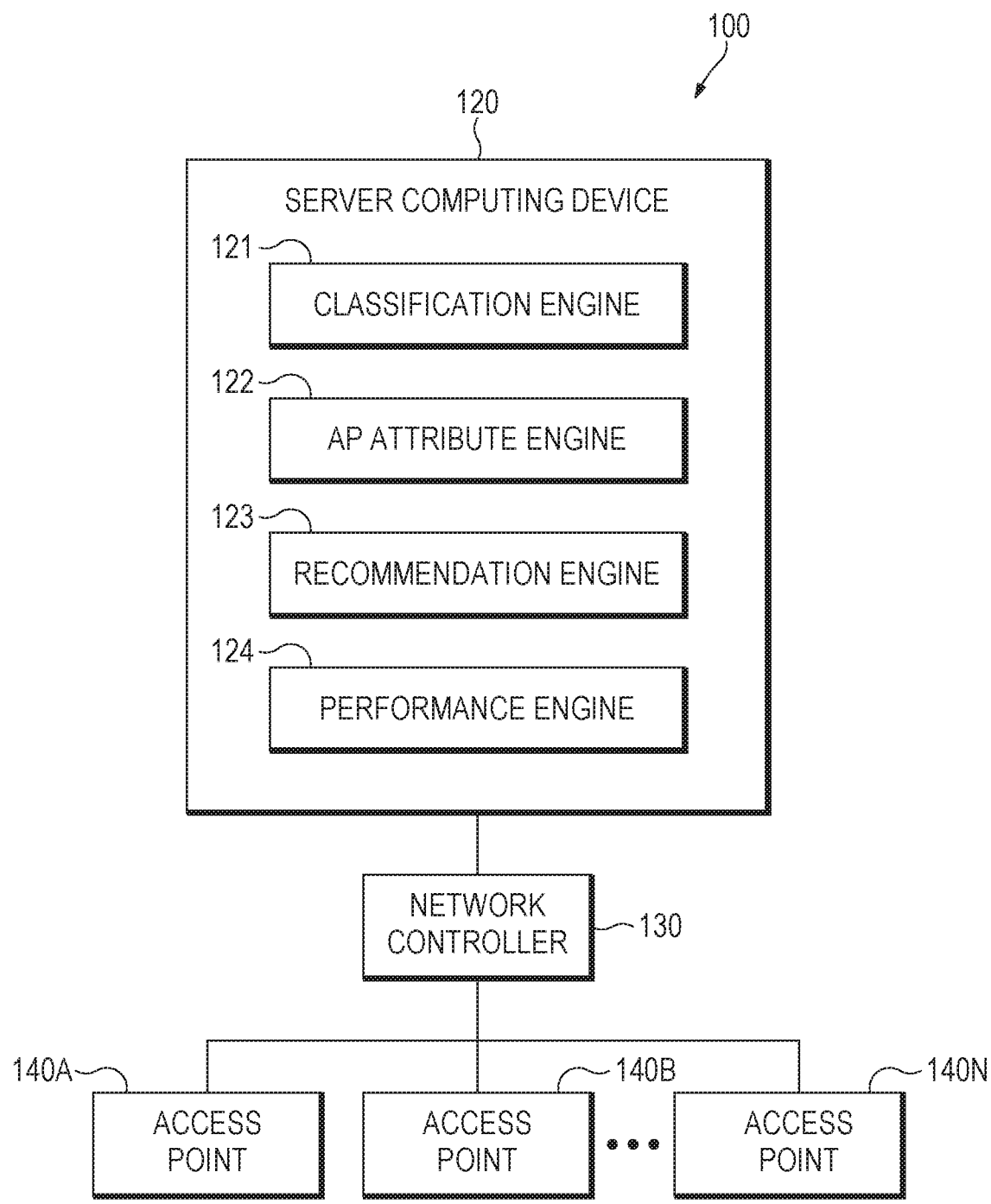
FIG. 1 is a block diagram depicting an example environment in which various examples disclosed herein may be implemented to classify access points (APs).

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Access points (AP) may be configured with respect to their radio parameters, port operation parameters, regulatory domain parameters, Quality of Service (QoS) parameters, and/or other configuration parameters that are used to configure an AP. APs can operate and be deployed in various types of environment. For example, various types of environment may include auditoriums, offices, cubes, labs, dorms, outdoors, etc. For each type of environment, AP attributes such as the placement density, wireless propagation characteristics, the number and type of client devices, and the traffic and application usage may greatly vary.

However, APs are usually configured with a default or predefined configuration setting that may be further modified to a particular type of environment once deployed. Even then, the further modification merely considers a small set of physical properties of building layout (e.g., walls, AP spacing, and building type). Occasionally, an expert may be dispatched to the site who will analyze specific performance problems and try to address them by manually tuning the configuration setting for each AP. This is a very labor intensive process and not practical for most medium to large deployments. Also, this manual tuning process fails to adapt to changing network conditions (e.g., device type, device load, new application requirements, etc.). For example, traffic load changes may dramatically change from the classrooms to the dorms within the course of a day, and traffic load and application type may change between recreational areas and libraries during the course of a school semester. Thus, automatically configuring a large set of APs while considering the dynamic environmental factors would greatly improve the network performance, but is a technically challenging task.

Examples disclosed herein provide technical solutions to these technical challenges by automatically classifying APs and/or determining a recommended configuration setting to be applied to APs by class.

Some or all of example functionalities disclosed herein may be implemented in and/or performed by a server computing device, as further discussed in detail below. In some implementations, some or all of example functionalities disclosed herein may be implemented in and/or performed by a network device such as an AP and a network controller.

A "user" may refer to any user that interfaces with an AP (e.g., items 140A, 140B, ..., 140N of FIG. 1), a client computing device that is in communication with an AP, a network controller (e.g., item 130 of FIG. 1), and/or a server computing device (e.g., item 120 of FIG. 1). A user may include a system administrator/operator, an equipment installer, an end user, or any other types of users.

Some of the examples disclosed herein enable classifying APs based on at least one AP attribute of each AP. Classification is a task of assigning objects (e.g., APs) to one of several predefined "classes." A classification technique (or classifier) builds classification models from an input data set. Example classification techniques may include clustering technique (e.g., k-means clustering), neighbor classifiers (e.g., k-nearest neighbor classifier), support vector machines, naïve Bayes classifiers, and/or other classification techniques. Each technique employs a learning algorithm to builds a classification model that best fits the relationship between the attribute set (e.g., AP attributes) and class label of the input data.

Figure 7:
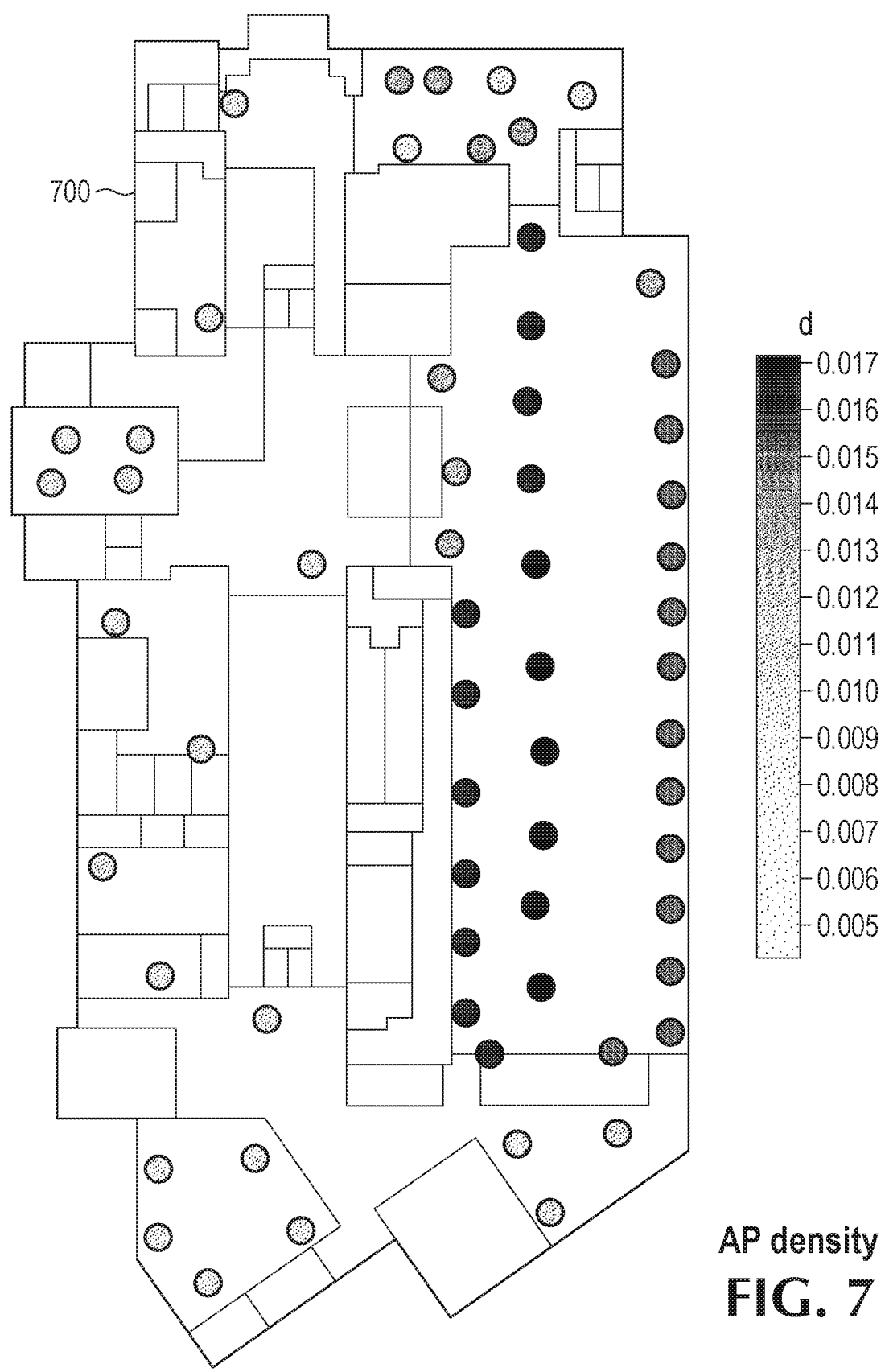
FIG. 7 is a site map depicting the example deployment of APs of FIG. 6 by a first AP attribute (e.g., AP density).
Figure 8:
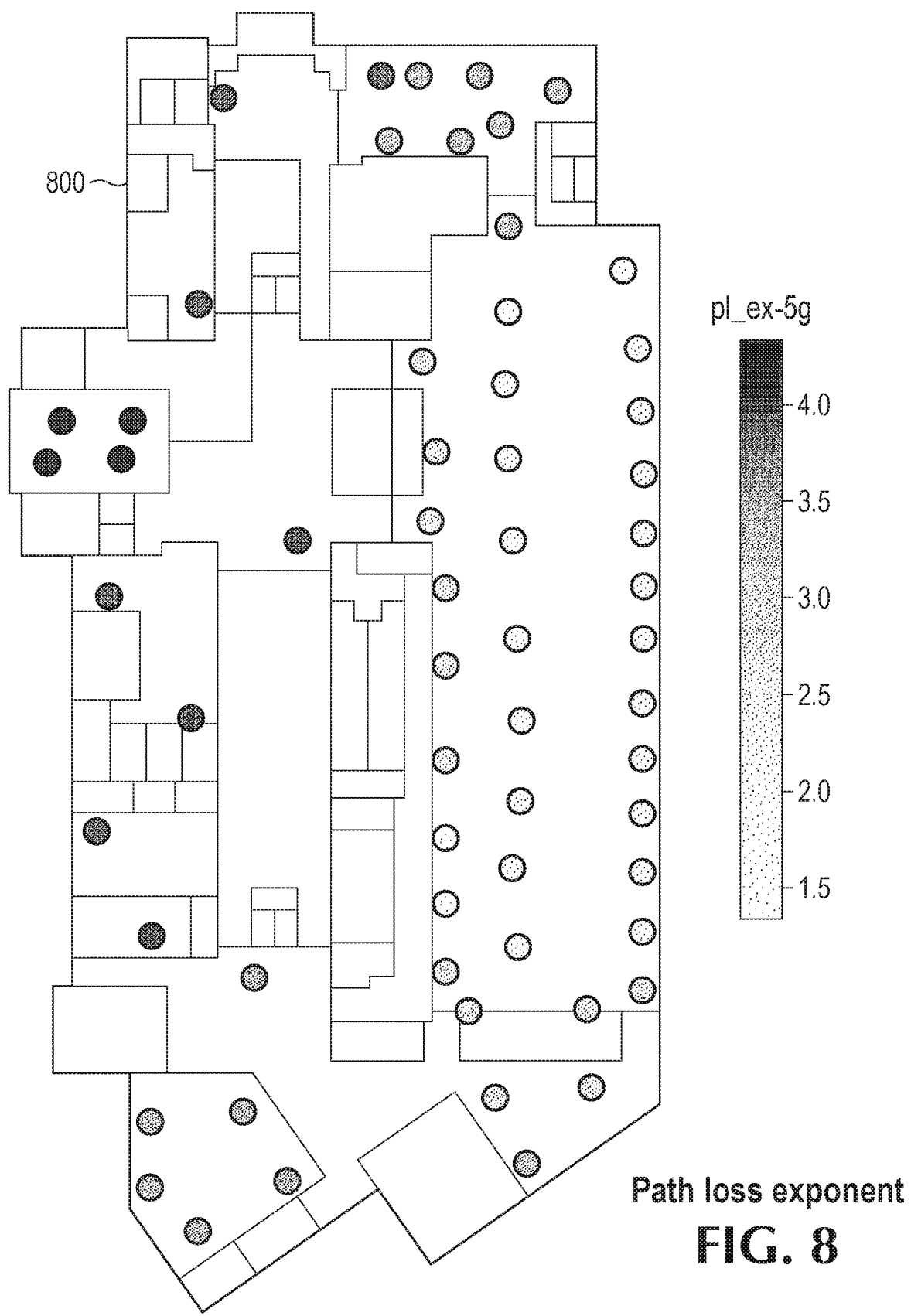
FIG. 8 is a site map depicting the example deployment of APs of FIG. 6 by a second AP attribute (e.g., path loss exponent).
Figure 9:
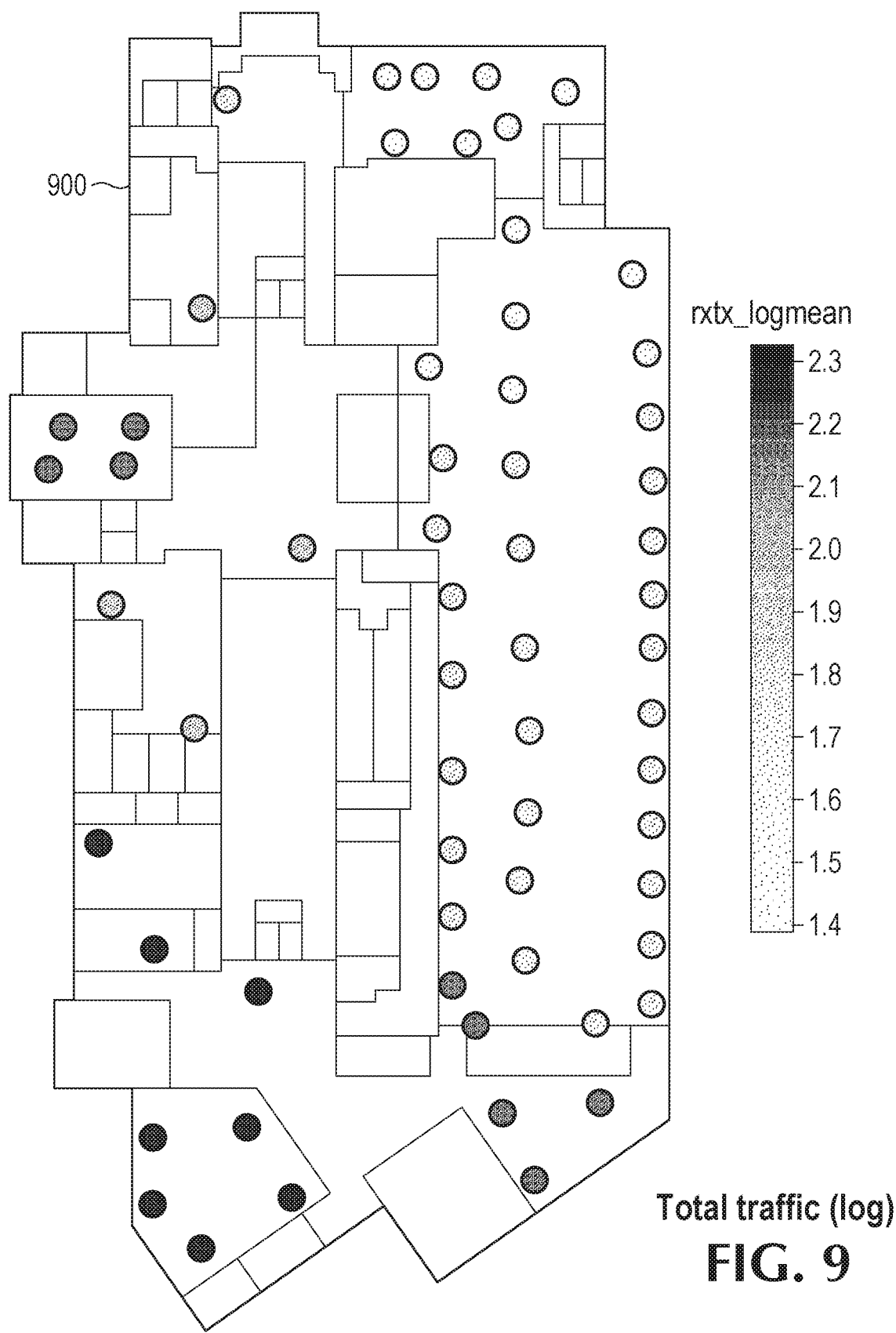
FIG. 9 is a site map depicting the example deployment of APs of FIG. 6 by a third AP attribute (e.g., total traffic).
Figure 10:
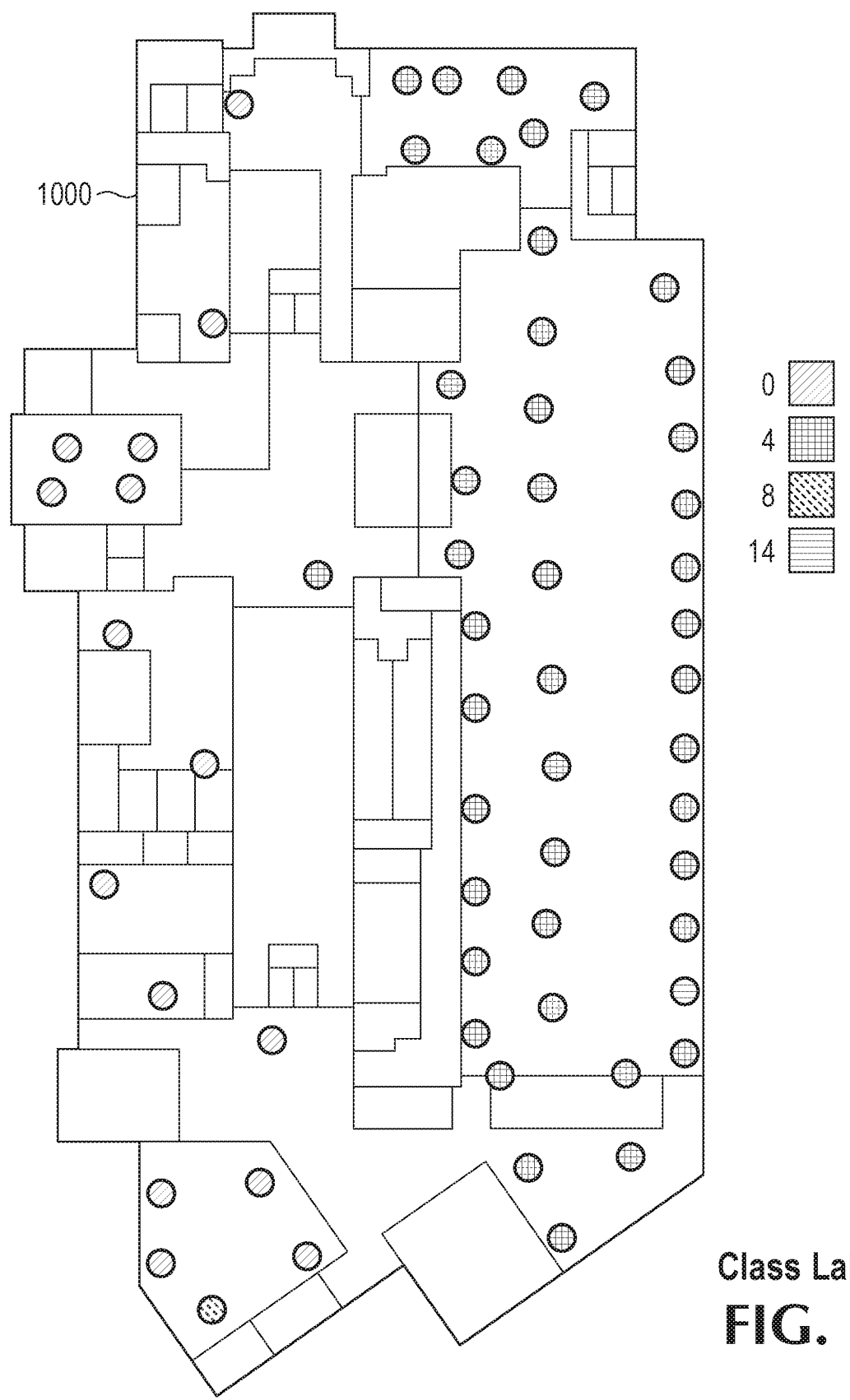
FIG. 10 is a site map depicting example class labels for APs of FIG. 6.

In some implementations, the classification may occur in two phases. In the first phase, it may generate a set of "class labels" into which APs (e.g., training data) may be classified. For example, this can be accomplished using a classification technique such as a clustering technique. A clustering technique may generate several clusters of APs where APs in one cluster are more similar to each other than to those in other clusters. This can be done by analyzing AP attributes of the APs. The analysis of different example AP attributes are illustrated in FIGS. 7-9. APs sharing a similar set of AP attributes may be grouped into a same cluster. Example class labels generated using such a clustering technique are illustrated in FIG. 10. FIG. 10 depicts a site map 1000 that shows APs (illustrated as circles where each circle represents an AP and its placement on the site map) that are clustered into 4 class labels that have been generated, including Class Label 0, Class Label 4, Class Label 8, and Class Label 14. A majority of the APs located on the left side of the site belong to a first class (denoted by Class Label 0) where a majority of the APs located on the right side of the site belong to a second class (denoted by Class Label 4). The resulting class labels may be validated by a user such as a system administrator to improve the accuracy of the classification model. In the second phase of the classification, it may classify new APs into one of the class labels (e.g., that are generated during the first phase as discussed above) based on the AP attributes of the new APs. The second phase of the classification may be accomplished using a similar clustering technique or another type of classification technique.

An "AP attribute" of an AP may include at least one of: hardware attributes (e.g., a product model/type of the AP), radio propagation attributes (e.g., path loss exponent, through-ceiling loss, number of adjacent floors, etc.), AP arrangement attributes (e.g., AP density, AP uniformity, AP capabilities, etc.), user behavior attributes (e.g., user density, user mobility, connection duration, client device class mix, the number and type of client devices being connected to the AP, etc.), traffic attributes (e.g., offered load statistics, application type distribution, UL/DL ratio, etc.), application attributes (e.g., type of applications, application usage, etc. where "applications" refer to applications run on client devices that are connected to the AP), and/or other characteristics or attributes of the AP. Some example AP attributes are illustrated in FIG. 5. AP attributes may originate from various sources, including but not being limited to a network management server (e.g., Aruba Central™, Airwave™, etc.), network controllers, APs (e.g., statistics and other information collected by APs themselves), and client computing devices that are connected to APs.

Figure 6:
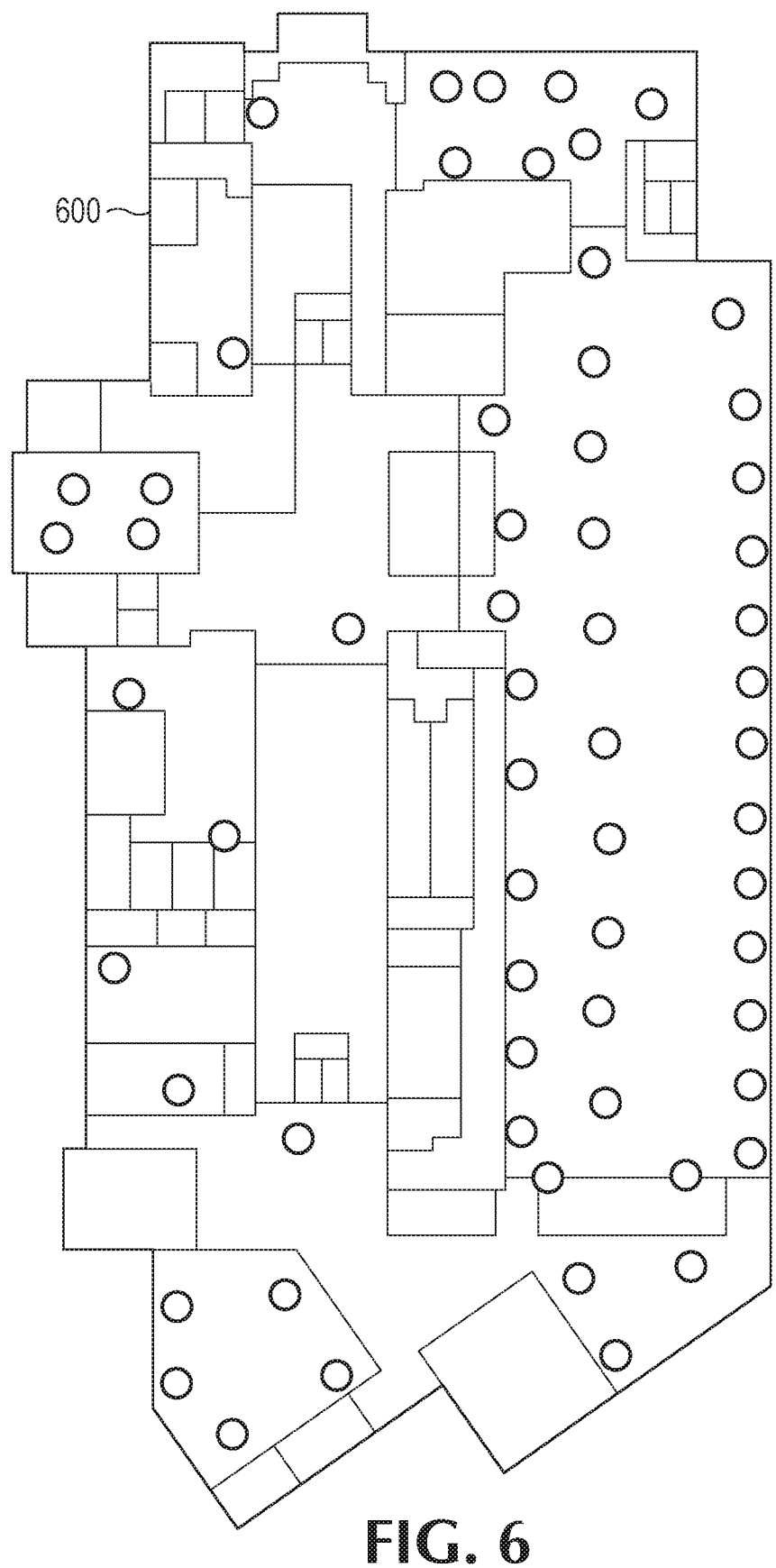
FIG. 6 is a site map depicting an example deployment of APs.

In some implementations, a "class" (or also referred to herein as a "class label") may represent a particular environment type (e.g., a type of environment that APs are deployed in). A certain set of AP attributes(s) may be representative characteristics of a particular environment type. A first class may represent an environment type such as a lecture hall with large rooms, high client density, and low client mobility. A second class may represent an environment type such as a cafeteria with medium client density, short-lived connections, and highly mobile users. A third class may represent an environment type such as a dorm building with small rooms, low client density, high traffic demand, and diverse client devices. For instance, one deployment environment such as a deployment site as illustrated in FIG. 6 may include several different "types" of environment (e.g., library entrance area, library archive stacks, ball room, cafeteria, etc.). Thus, a particular "class" of APs may include a group of APs that share a similar set of AP attributes or characteristics (e.g., a class having APs that show characteristics of high AP density, high loss, high station density, and high video streaming). Note that a particular class of APs may include APs from different deployment environments. For example, a first set of APs have been deployed to a first building, and a second set of APs have been deployed to a second building. One class of APs may include some APs from the first set of APs and some APs from the second set of APs.

In some implementations, although APs are deployed in the same physical deployment environment space (e.g., ball room), such APs may be classified into more than one classes depending on time (e.g., the value of a certain AP attribute may vary by time of the day), space (e.g., the value of a certain AP attribute may vary by a physical location of the AP in the environment), specific events, and/or other environmental factors. This means that one particular AP deployed in the ball room can be part of more than one classes depending on such environmental factors. For example, the ball room can be used to hold various events, and because of this, some of the AP attributes such as the traffic load and application types and usage can greatly vary from one event that was held last week to another event that was held this week. In this case, one particular AP located in the ball room can be part of Class Label A for last week but in a different class (Class Label B) for this week.

In some implementations, the first phase of classification may be performed based on user input (e.g., a user such as a system administrator and/or other users may manually come up with different class labels to use). In these implementations, the second phase of classification may automatically classify new APs into such manually created class labels based on their associated AP attributes using a classification technique as discussed herein.

In some implementations, the second phase of classification may be performed based on user input (e.g., a user such as a system administrator and/or other users may manually classify each new AP into different class labels). In these implementations, the first phase of classification may automatically generate a set of class labels using training data using a classification technique, as discussed above.

Some of the examples disclosed herein enable determining a recommended configuration setting for the APs that have been classified into a same class. By classifying the APs by class or environment type, a configuration setting can be tailored to each specific environment type, resulting in improved performance of APs and improved network efficiency. Performance metrics may be compared amongst the available instances that belong to the same class or environment type. Depending on the environment type, different configuration settings are appropriate to ensure network efficiency. For example, when the APs are densely deployed (e.g., the spacing between APs is relatively small), reducing the radio transmit power (e.g., an example configuration parameter) at the APs would result in less interference, less contention and better average throughput. For each environment type, there is a mapping between configuration settings and performance metrics. Using this information, a configuration setting that optimizes the performance metrics for the particular environment type may be recommended, as further discussed below.

In determining a recommended configuration setting to be applied to a particular class of APs, a relationship between different configuration settings and performance of APs may be studied and evaluated. For each class or environment type, a machine-learning algorithm may be used to "learn" the relationship or linkage between configuration settings and performance of the APs in that class. In doing so, at least one performance metric may be selected or otherwise identified, and the performance metric(s) may be used to monitor and/or evaluate the performance of the APs in the particular class. A "performance metric" may refer to a metric to measure performance of moving data between APs and client computing devices that are connected to APs. For example, a performance metric may include a coverage area of APs (e.g., coverage range), a capacity of APs (e.g., how much data can be moved between APs and client computing devices, the number of client devices that each AP can support, etc.), application latency (e.g., latency of moving data from APs to client computing devices), network jitter, packet error rate, speed, throughput, other metrics that measure efficiency of APs, and/or other criteria or metrics.

In some implementations, the performance metric(s) may be selected based on user input (e.g., manual selection by any user including a system administrator). In other implementations, the performance metric(s) may be automatically selected or otherwise identified by the system based on deployment data. For example, a capacity limited location may need to optimize the efficiency (e.g., therefore selecting the efficiency as a performance metric). In another example, a UL RSSI limited deployment may need to optimize the AP coverage (e.g., therefore selecting the coverage as a performance metric). In another example, some locations may need to optimize single user peak speed or multiuser joint rate.

In some implementations, the performance metric(s) for each AP in the same class may be monitored and/or collected for a period of time (e.g., continuous collection, for a scheduled or predefined time period, etc.). The collected performance data may be evaluated relative to a configuration setting that has been applied to each AP. A "configuration setting" may include a set of configuration parameters and their associated configuration parameter values. A configuration parameter may include a radio parameter, a port operation parameter, a regulatory domain parameter, a Quality of Service (QoS) parameter, a security-related parameter, and/or other configuration parameters that are used to configure an AP. Example configuration parameters may include 802.11g Transmit power range (with its configuration parameter value being "6 to 12 dBm"), 802.11g Beacon rate (with its configuration parameter value being "1 Mbps"), 802.11g Radio enable fraction (with its configuration parameter value being "0.95"), 802.11a Transmit power range (with its configuration parameter value being "12 to 18 dBm"), 802.11a Beacon rate (with its configuration parameter value being "6 Mbps"), and 802.11a Bandwidth (with its configuration parameter value being "20 MHz").

A recommended configuration setting for a particular AP may be determined based on the performance data and configuration parameters (and values thereof) of the APs in the same class. For example, a first set of APs have been deployed to "ABC Hall." Based on their AP attributes of the first set of APs, the first set of APs have been classified into one particular type of environment. A second set of APs have been deployed to "XYZ Hall." Based on their AP attributes of the second set of APs, it has been determined that the second set of APs should be also classified into the same type of environment as "ABC Hall." Based on the performance data collected from the first set of APs and the configuration parameters/values for the first set of APs, a particular configuration setting may be recommended for the second set of APs. Using the example configuration parameters as discussed above, 802.11g Transmit power range may be recommended to be changed to 3 to 6 dBm, 802.11g Beacon rate may be recommended to be changed to 11 Mbps, and 802.11a Transmit power range may be recommended to be changed to 12 to 14 dBm. The existing configuration for the rest of configuration parameters (e.g., 802.11g Radio enable fraction, 802.11a Beacon rate, and 802.11a Bandwidth) may remain the same. A recommended configuration setting may recommend a single configuration parameter be changed or a plurality of configuration parameters be simultaneously changed.

A recommended configuration setting may be determined based on a passive approach or an active approach. Under the passive approach, configuration settings and performance data of the existing APs in the same class can be evaluated to determine a recommended configuration setting for another AP. Under the active approach, different "test" configuration settings can be applied to APs, and resulting AP performance based on those test cases may be monitored and collected where the performance data would be compared against the selected performance metric(s). A best test configuration setting that optimized the selected performance metric(s) may be recommended.

A recommended configuration settings may be determined in various ways. For example, a first configuration parameter/value that was applied to a first AP of the class may be determined as the configuration that achieved the best result in terms of a certain performance metric that was selected. A second configuration parameter/value that was applied to a second AP of the class may be determined as the configuration that achieved the best result in terms of a certain performance metric that was selected. In this example, the first configuration parameter/value and second configuration parameter/value may be part of a recommended configuration setting to be applied to the APs in that class. As a result, a recommended configuration setting may include a collection of configuration parameters/values from several different APs. In another example, from the same class, a particular AP that showed the highest or best performance may be identified, and the configuration setting that has been applied to that particular AP may be identified and/or determined as a recommended configuration setting for the entire class of APs. Although some examples are discussed above, various other ways or algorithms may be used to determine a recommended configuration setting for the class.

Some of the examples disclosed herein enable automatically applying the recommended configuration setting to configure a portion of or all of the APs in the same class.

The AP classification process and/or configuration recommendation process as discussed herein may be an iterative process. For example, AP attributes may be updated (e.g., a different set of AP attributes may be selected for classification, and/or new values for AP attributes arrive as the attributes are monitored continuously, for a specific time period (e.g., daily peak time), and/or for a specific event (e.g., a weekly conference)), resulting in re-generating class labels, re-classifying APs, re-generating a recommended configuration setting, and so forth. In another example, the performance data may be updated (e.g., a different set of performance metrics may be selected, and/or new data point arrive as the performance data is continuously monitored, for a specific time period, and/or for a specific event), resulting in re-generating a recommended configuration setting and so forth.

In some implementations, some of the examples discussed herein may enable providing a different type of recommendation (other than a recommended configuration setting) based on monitoring and/or evaluating the performance of the APs in a particular class against the selected performance metric(s). The recommendation may include a recommended AP product model or type to be deployed, a recommended AP placement strategy, a recommended upgrade of AP hardware/software, a recommended AP replacement schedule, and/or other recommendations.

In some implementations, AP attributes may be weighted differently, meaning that one AP attribute may be weighted higher than another AP attribute. A weight may specify a degree of importance of each AP attribute relative to other APs. The first and/or second phase(s) of the classification may consider the weights assigned to each AP attribute while performing the classification. Weights may be created and/or assigned manually by a user, or automatically created and/or assigned by the system.

In some implementations, performance metrics may be weighted differently, meaning that one performance metric may be weighted higher than another performance metric. A weight may specify a degree of importance of each metric relative to other metrics. The weights assigned to each performance metric may be considered in determining a recommended configuration setting. Weights may be created and/or assigned manually by a user, or automatically created and/or assigned by the system.

In some implementations, a user (e.g., a system administrator and/or other users) may disable certain AP attributes, certain configuration parameters, and/or certain performance metrics. In one example, the disabled attributes, parameters, and/or performance metrics would not be considered (e.g., would be disregarded) in the AP classification and/or configuration recommendation. In this example, a user may determine that the outdoor coverage is not important and should not be considered as one of the performance metrics, and disable that performance metric as a result. In another example, the values for the disabled configuration parameters may not be changed in respective APs (e.g., the user may choose not to change a minimum data rate due to a backward compatibility requirement).

In some instances, there could be multiple environment types in a small physical deployment environment space. In some implementations, APs that have been classified into a plurality of different classes may be aggregated into one group. For example, a first set of APs that are located in the offices and that have been classified into Class Label "Office," may be aggregated with a second set of APs that are located in the cubes near those offices and that have been classified into Class Label "Cube." In another example, an auditorium may be surrounded by several smaller classrooms. Although APs have been divided into two different classes, one class for the auditorium and another class for the classrooms, those APs may be aggregated into one group. Such an aggregation technique may be useful in providing a joint configuration setting that works across APs in different classes (or environment types) that operate in overlapping wireless (sharing or interfering) space.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is a block diagram depicting an example environment 100 in which various examples disclosed herein may be implemented to classify access points (APs). Environment 100 may include various components including server computing device 120, network controller 130, access points (APs) 140 (illustrated as 140A, 140B, . . . , 140N), and client computing devices (not illustrated) that may be in communication with APs 140.

Server computing device 120 may comprise a network server computing device (e.g., Dynamic Host Configuration Protocol (DHCP) server, authentication server, security policy management server, a network management server that monitors health and performance of a network and/or configures devices connected to the management server, etc.), and/or other server computing devices that may be in communication with a network server computing device. While server computing device 120 is depicted as a single computing device, server computing device 120 may include any number of integrated or distributed computing devices (e.g., a cloud server).

Network controller 130 may refer to a controlling device that manages other network devices such as APs 140. Network controller 130 may handle automatic adjustments to radio frequency power, wireless channels, wireless authentication, and/or security. Furthermore, network controller 130 can be combined to form a wireless mobility group to allow inter-controller roaming. Network controller 130 may be part of a mobility domain to allow clients access throughout large or regional enterprise facility locations.

APs 140 may refer to a set of wireless network devices that allow client devices (not illustrated) to connect to a wired network using IEEE 802.11 or related standards. The APs usually connect to a router via a wired network, but can also be an integral component to the router itself.

Client computing devices (not illustrated) may be any type of computing device providing a user interface through which a user can interact with a software application. For example, client computing devices may include a laptop computing device, a desktop computing device, an all-in-one computing device, a thin client, a workstation, a tablet computing device, a mobile phone, an electronic book reader, a network-enabled appliance such as a "Smart" television, and/or other electronic device suitable for displaying a user interface and processing user interactions with the displayed interface.

The various components (e.g., components 120, 130, and/or 140) depicted in FIG. 1 may be coupled to at least one other component via a network. Network may comprise any infrastructure or combination of infrastructures that enable electronic communication between the components. For example, network may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network), and/or other network.

Server computing device 120 may comprise a classification engine 121, an AP attribute engine 122, a recommendation engine 123, a performance engine 124, and/or other engines. The term "engine", as used herein, refers to a combination of hardware and programming that performs a designated function. As is illustrated respect to FIG. 3, the hardware of each engine, for example, may include one or both of a processor and a machine-readable storage medium, while the programming is instructions or code stored on the machine-readable storage medium and executable by the processor to perform the designated function.

Although FIG. 1 illustrates engines 121-124 as part of server computing device 120, engines 121-124 (or any portion thereof) may be implemented in and/or performed by network controller 130. Engines 121-124 (or any portion thereof) may be implemented in and/or performed by an AP 140. Furthermore, in FIG. 1 and other Figures described herein, different numbers of components or entities than depicted may be used.

Classification engine 121 may enable classifying APs based on at least one AP attribute of each AP. Classification is a task of assigning objects (e.g., APs) to one of several predefined "classes." A classification technique (or classifier) builds classification models from an input data set. Example classification techniques may include clustering technique (e.g., k-means clustering), neighbor classifiers (e.g., k-nearest neighbor classifier), support vector machines, naïve Bayes classifiers, and/or other classification techniques. Each technique employs a learning algorithm to builds a classification model that best fits the relationship between the attribute set (e.g., AP attributes) and class label of the input data.

In some implementations, the classification may occur in two phases. In the first phase, classification engine 122 may generate a set of "class labels" into which APs (e.g., training data) may be classified. For example, this can be accomplished using a classification technique such as a clustering technique. A clustering technique may generate several clusters of APs where APs in one cluster are more similar to each other than to those in other clusters. This can be done by analyzing AP attributes of the APs. The analysis of different example AP attributes are illustrated in FIGS. 7-9. In FIGS. 7-9, each circle represents an AP on a site map, and the placement of each circle represents the placement of the corresponding AP on the site map. In FIG. 7, the level of darkness in each shaded circle indicates varying degrees of a first AP attribute, AP density, ranging from 0 to 0.017 in this example. In this example, the APs that are located on the right side of the site map generally have a higher AP density value than the APs that are located on the left side of the site map. Similarly, in FIG. 8, the level of darkness in each shaded circle indicates varying degrees of a second AP attribute, path loss exponent (denoted by "pl_ex-5g"), ranging from 0 to 4.5 in this example. In this example, the APs that are located on the left side of the site map generally have a higher path loss exponent value than the APs that are located on the right side of the site map. In FIG. 8, the level of darkness in each shaded circle indicates varying degrees of a third AP attribute, total traffic (denoted by "rxtx_log-mean"), ranging from 0 to 2.3 in this example. In this example, the APs that are located towards the bottom left portion of the site map generally have a higher total traffic value than the APs that are located towards the top right portion of the site map. Although the three AP attributes are discussed in the examples shown in FIG. 7-9, any other AP attributes as discussed herein may be used for the analysis of AP attributes.

APs sharing a similar set of AP attributes (e.g., similar in AP density values, similar in path loss exponent values, and/or similar in total traffic values) may be grouped into a same cluster. Example class labels generated using such a clustering technique are illustrated in FIG. 10. FIG. 10 depicts a site map 1000 that shows APs that are clustered into 4 class labels that have been generated, including Class Label 0, Class Label 4, Class Label 8, and Class Label 14. A majority of the APs located on the left side of the site belong to a first class (denoted by Class Label 0) where a majority of the APs located on the right side of the site belong to a second class (denoted by Class Label 4). The resulting class labels may be validated by a user such as a system administrator to improve the accuracy of the classification model. In the second phase of the classification, it may classify new APs into one of the class labels (e.g., that are generated during the first phase as discussed above) based on the AP attributes of the new APs. The second phase of the classification may be accomplished using a similar clustering technique or another type of classification technique.

AP attribute engine 122 may select or otherwise identify AP attributes for classification engine 121. An "AP attribute" of an AP may include at least one of: hardware attributes (e.g., a product model/type of the AP), radio propagation attributes (e.g., path loss exponent, through-ceiling loss, number of adjacent floors, etc.), AP arrangement attributes (e.g., AP density, AP uniformity, AP capabilities, etc.), user behavior attributes (e.g., user density, user mobility, connection duration, client device class mix, the number and type of client devices being connected to the AP, etc.), traffic attributes (e.g., offered load statistics, application type distribution, UL/DL ratio, etc.), application attributes (e.g., type of applications, application usage, etc. where "applications" refer to applications run on client devices that are connected to the AP), and/or other characteristics or attributes of the AP. Some example AP attributes are illustrated in FIG. 5. AP attributes may originate from various sources, including but not being limited to a network management server (e.g., Aruba Central™, Airwave™, etc.), network controllers, APs (e.g., statistics and other information collected by APs themselves), and client computing devices that are connected to APs.

In some implementations, a "class" (or also referred to herein as a "class label") may represent a particular environment type (e.g., a type of environment that APs are deployed in). A certain set of AP attributes(s) may be representative characteristics of a particular environment type. A first class may represent an environment type such as a lecture hall with large rooms, high client density, and low client mobility. A second class may represent an environment type such as a cafeteria with medium client density, short-lived connections, and highly mobile users. A third class may represent an environment type such as a dorm building with small rooms, low client density, high traffic demand, and diverse client devices. For instance, one deployment environment such as a deployment site as illustrated in FIG. 6 may include several different "types" of environment (e.g., library entrance area, library archive stacks, ball room, cafeteria, etc.). Thus, a particular "class" of APs may include a group of APs that share a similar set of AP attributes or characteristics (e.g., a class having APs that show characteristics of high AP density, high loss, high station density, and high video streaming). Note that a particular class of APs may include APs from different deployment environments. For example, a first set of APs have been deployed to a first building, and a second set of APs have been deployed to a second building. One class of APs may include some APs from the first set of APs and some APs from the second set of APs.

In some implementations, although APs are deployed in the same physical deployment environment space (e.g., ball room), such APs may be classified into more than one classes depending on time (e.g., the value of a certain AP attribute may vary by time of the day), space (e.g., the value of a certain AP attribute may vary by a physical location of the AP in the environment), specific events, and/or other environmental factors. This means that one particular AP deployed in the ball room can be part of more than one classes depending on such environmental factors. For example, the ball room can be used to hold various events, and because of this, some of the AP attributes such as the traffic load and application types and usage can greatly vary from one event that was held last week to another event that was held this week. In this case, one particular AP located in the ball room can be part of Class Label A for last week but in a different class (Class Label B) for this week.

In some implementations, the first phase of classification may be performed based on user input (e.g., a user such as a system administrator and/or other users may manually come up with different class labels to use). In these implementations, the second phase of classification may automatically classify new APs into such manually created class labels based on their associated AP attributes using a classification technique as discussed herein.

In some implementations, the second phase of classification may be performed based on user input (e.g., a user such as a system administrator and/or other users may manually classify each new AP into different class labels). In these implementations, the first phase of classification may automatically generate a set of class labels using training data using a classification technique, as discussed above.

Recommendation engine 123 may enable determining a recommended configuration setting for the APs that have been classified into a same class. By classifying the APs by class or environment type, a configuration setting can be tailored to each specific environment type, resulting in improved performance of APs and improved network efficiency. Performance metrics may be compared amongst the available instances that belong to the same class or environment type. Depending on the environment type, different configuration settings are appropriate to ensure network efficiency. For example, when the APs are densely deployed (e.g., the spacing between APs is relatively small), reducing the radio transmit power (e.g., an example configuration parameter) at the APs would result in less interference, less contention and better average throughput. For each environment type, there is a mapping between configuration settings and performance metrics. Using this information, a configuration setting that optimizes the performance metrics for the particular environment type may be recommended, as further discussed below.

In determining a recommended configuration setting to be applied to a particular class of APs, a relationship between different configuration settings and performance of APs may be studied and evaluated. For each class or environment type, a machine-learning algorithm may be used to "learn" the relationship or linkage between configuration settings and performance of the APs in that class.

In doing so, performance engine 124 may select or otherwise identify at least one performance metric, and the performance metric(s) may be used to monitor and/or evaluate the performance of the APs in the particular class. A "performance metric" may refer to a metric to measure performance of moving data between APs and client computing devices that are connected to APs. For example, a performance metric may include a coverage area of APs (e.g., coverage range), a capacity of APs (e.g., how much data can be moved between APs and client computing devices, the number of client devices that each AP can support, etc.), application latency (e.g., latency of moving data from APs to client computing devices), network jitter, packet error rate, speed, throughput, other metrics that measure efficiency of APs, and/or other criteria or metrics.

In some implementations, the performance metric(s) may be selected based on user input (e.g., manual selection by any user including a system administrator). In other implementations, the performance metric(s) may be automatically selected or otherwise identified by the system based on deployment data. For example, a capacity limited location may need to optimize the efficiency (e.g., therefore selecting the efficiency as a performance metric). In another example, a UL RSSI limited deployment may need to optimize the AP coverage (e.g., therefore selecting the coverage as a performance metric). In another example, some locations may need to optimize single user peak speed or multiuser joint rate.

In some implementations, the performance metric(s) for each AP in the same class may be monitored and/or collected for a period of time (e.g., continuous collection, for a scheduled or predefined time period, etc.). The collected performance data may be evaluated relative to a configuration setting that has been applied to each AP. A "configuration setting" may include a set of configuration parameters and their associated configuration parameter values. A configuration parameter may include a radio parameter, a port operation parameter, a regulatory domain parameter, a Quality of Service (QoS) parameter, a security-related parameter, and/or other configuration parameters that are used to configure an AP. Example configuration parameters may include 802.11g Transmit power range (with its configuration parameter value being "6 to 12 dBm"), 802.11g Beacon rate (with its configuration parameter value being "1 Mbps"), 802.11g Radio enable fraction (with its configuration parameter value being "0.95"), 802.11a Transmit power range (with its configuration parameter value being "12 to 18 dBm"), 802.11a Beacon rate (with its configuration parameter value being "6 Mbps"), and 802.11a Bandwidth (with its configuration parameter value being "20 MHz").

A recommended configuration setting for a particular AP may be determined based on the performance data and configuration parameters (and values thereof) of the APs in the same class. For example, a first set of APs have been deployed to "ABC Hall." Based on their AP attributes of the first set of APs, the first set of APs have been classified into one particular type of environment. A second set of APs have been deployed to "XYZ Hall." Based on their AP attributes of the second set of APs, it has been determined that the second set of APs should be also classified into the same type of environment as "ABC Hall." Based on the performance data collected from the first set of APs and the configuration parameters/values for the first set of APs, a particular configuration setting may be recommended for the second set of APs. Using the example configuration parameters as discussed above, 802.11g Transmit power range may be recommended to be changed to 3 to 6 dBm, 802.11g Beacon rate may be recommended to be changed to 11 Mbps, and 802.11a Transmit power range may be recommended to be changed to 12 to 14 dBm. The existing configuration for the rest of configuration parameters (e.g., 802.11g Radio enable fraction, 802.11a Beacon rate, and 802.11a Bandwidth) may remain the same. A recommended configuration setting may recommend a single configuration parameter be changed or a plurality of configuration parameters be simultaneously changed.

A recommended configuration setting may be determined based on a passive approach or an active approach. Under the passive approach, configuration settings and performance data of the existing APs in the same class can be evaluated to determine a recommended configuration setting for another AP. Under the active approach, different "test" configuration settings can be applied to APs, and resulting AP performance based on those test cases may be monitored and collected where the performance data would be compared against the selected performance metric(s). A best test configuration setting that optimized the selected performance metric(s) may be recommended.

A recommended configuration settings may be determined in various ways. For example, a first configuration parameter/value that was applied to a first AP of the class may be determined as the configuration that achieved the best result in terms of a certain performance metric that was selected. A second configuration parameter/value that was applied to a second AP of the class may be determined as the configuration that achieved the best result in terms of a certain performance metric that was selected. In this example, the first configuration parameter/value and second configuration parameter/value may be part of a recommended configuration setting to be applied to the APs in that class. As a result, a recommended configuration setting may include a collection of configuration parameters/values from several different APs. In another example, from the same class, a particular AP that showed the highest or best performance may be identified, and the configuration setting that has been applied to that particular AP may be identified and/or determined as a recommended configuration setting for the entire class of APs. Although some examples are discussed above, various other ways or algorithms may be used to determine a recommended configuration setting for the class.

Some of the examples disclosed herein enable automatically applying the recommended configuration setting to configure a portion of or all of the APs in the same class.

The AP classification process and/or configuration recommendation process as discussed herein may be an iterative process. For example, AP attributes may be updated (e.g., a different set of AP attributes may be selected for classification, and/or new values for AP attributes arrive as the attributes are monitored continuously, for a specific time period (e.g., daily peak time), and/or for a specific event (e.g., a weekly conference)), resulting in re-generating class labels, re-classifying APs, re-generating a recommended configuration setting, and so forth. In another example, the performance data may be updated (e.g., a different set of performance metrics may be selected, and/or new data point arrive as the performance data is continuously monitored, for a specific time period, and/or for a specific event), resulting in re-generating a recommended configuration setting and so forth.

In some implementations, some of the examples discussed herein may enable providing a different type of recommendation (other than a recommended configuration setting) based on monitoring and/or evaluating the performance of the APs in a particular class against the selected performance metric(s). The recommendation may include a recommended AP product model or type to be deployed, a recommended AP placement strategy, a recommended upgrade of AP hardware/software, a recommended AP replacement schedule, and/or other recommendations.

In some implementations, AP attributes may be weighted differently, meaning that one AP attribute may be weighted higher than another AP attribute. A weight may specify a degree of importance of each AP attribute relative to other APs. The first and/or second phase(s) of the classification may consider the weights assigned to each AP attribute while performing the classification. Weights may be created and/or assigned manually by a user, or automatically created and/or assigned by the system.

In some implementations, performance metrics may be weighted differently, meaning that one performance metric may be weighted higher than another performance metric. A weight may specify a degree of importance of each metric relative to other metrics. The weights assigned to each performance metric may be considered in determining a recommended configuration setting. Weights may be created and/or assigned manually by a user, or automatically created and/or assigned by the system.

In some implementations, a user (e.g., a system administrator and/or other users) may disable certain AP attributes, certain configuration parameters, and/or certain performance metrics. In one example, the disabled attributes, parameters, and/or performance metrics would not be considered (e.g., would be disregarded) in the AP classification and/or configuration recommendation. In this example, a user may determine that the outdoor coverage is not important and should not be considered as one of the performance metrics, and disable that performance metric as a result. In another example, the values for the disabled configuration parameters may not be changed in respective APs (e.g., the user may choose not to change a minimum data rate due to a backward compatibility requirement).

In some instances, there could be multiple environment types in a small physical deployment environment space. In some implementations, APs that have been classified into a plurality of different classes may be aggregated into one group. For example, a first set of APs that are located in the offices and that have been classified into Class Label "Office," may be aggregated with a second set of APs that are located in the cubes near those offices and that have been classified into Class Label "Cube." In another example, an auditorium may be surrounded by several smaller classrooms. Although APs have been divided into two different classes, one class for the auditorium and another class for the classrooms, those APs may be aggregated into one group. Such an aggregation technique may be useful in providing a joint configuration setting that works across APs in different classes (or environment types) that operate in overlapping wireless (sharing or interfering) space.

Figure 2:
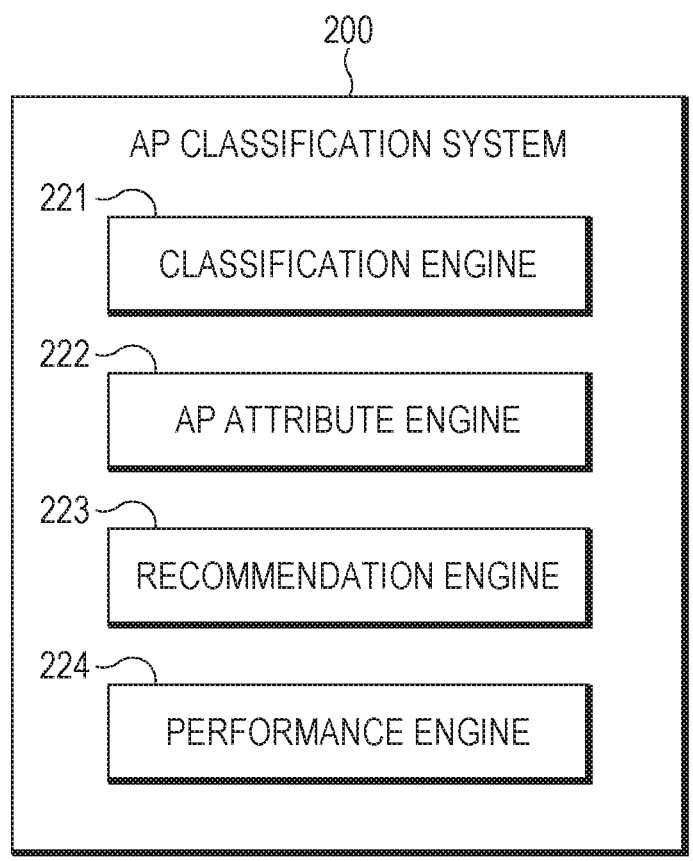
FIG. 2 is a block diagram depicting an example AP classification system.

FIG. 2 is a block diagram depicting an example AP classification system 200. AP classification system 200 may comprise a classification engine 221, an AP attribute engine 222, a recommendation engine 223, a performance engine 224, and/or other engines. According to various implementations, AP classification system 200 and the various components described herein may be implemented in hardware and/or a combination of hardware and programming that configures hardware. Engines 221-224 represent engine 122-124, respectively.

Figure 3:
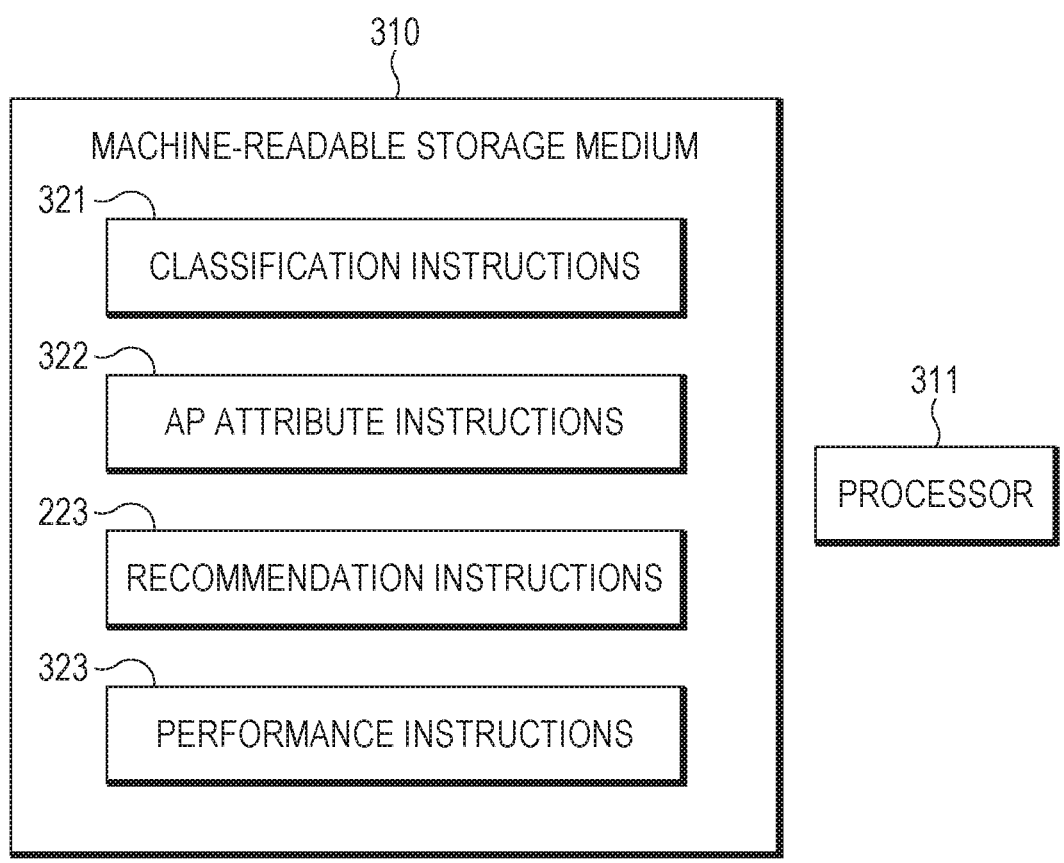
FIG. 3 is a block diagram depicting an example machine-readable storage medium comprising instructions executable by a processor for classifying APs.

FIG. 3 is a block diagram depicting an example machine-readable storage medium 310 comprising instructions executable by a processor for classifying APs.

In the foregoing discussion, engines 121-124 were described as combinations of hardware and programming. Engines 121-124 may be implemented in a number of fashions. Referring to FIG. 3, the programming may be processor executable instructions 321-324 stored on a machine-readable storage medium 310 and the hardware may include a processor 311 for executing those instructions. Thus, machine-readable storage medium 310 can be said to store program instructions or code that when executed by processor 311 implements AP classification system of FIG. 2.

In FIG. 3, the executable program instructions in machine-readable storage medium 310 are depicted as classification instructions 321, AP attribute instructions 322, recommendation instructions 323, and performance instructions 324. Instructions 321-324 represent program instructions that, when executed, cause processor 311 to implement engines 121-124, respectively.

Machine-readable storage medium 310 may be any electronic, magnetic, optical, or other physical storage device that contains or stores executable instructions. In some implementations, machine-readable storage medium 310 may be a non-transitory storage medium, where the term "non-transitory" does not encompass transitory propagating signals. Machine-readable storage medium 310 may be implemented in a single device or distributed across devices. Likewise, processor 311 may represent any number of processors capable of executing instructions stored by machine-readable storage medium 310. Processor 311 may be integrated in a single device or distributed across devices. Further, machine-readable storage medium 310 may be fully or partially integrated in the same device as processor 311, or it may be separate but accessible to that device and processor 311.

In one example, the program instructions may be part of an installation package that when installed can be executed by processor 311 to implement AP classification system 200. In this case, machine-readable storage medium 310 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-324, and/or other instructions. As an alternative or in addition to retrieving and executing instructions, processor 311 may include at least one electronic circuit comprising a number of electronic components for performing the functionality of at least one of instructions 321-324, and/or other instructions.

Figure 4:
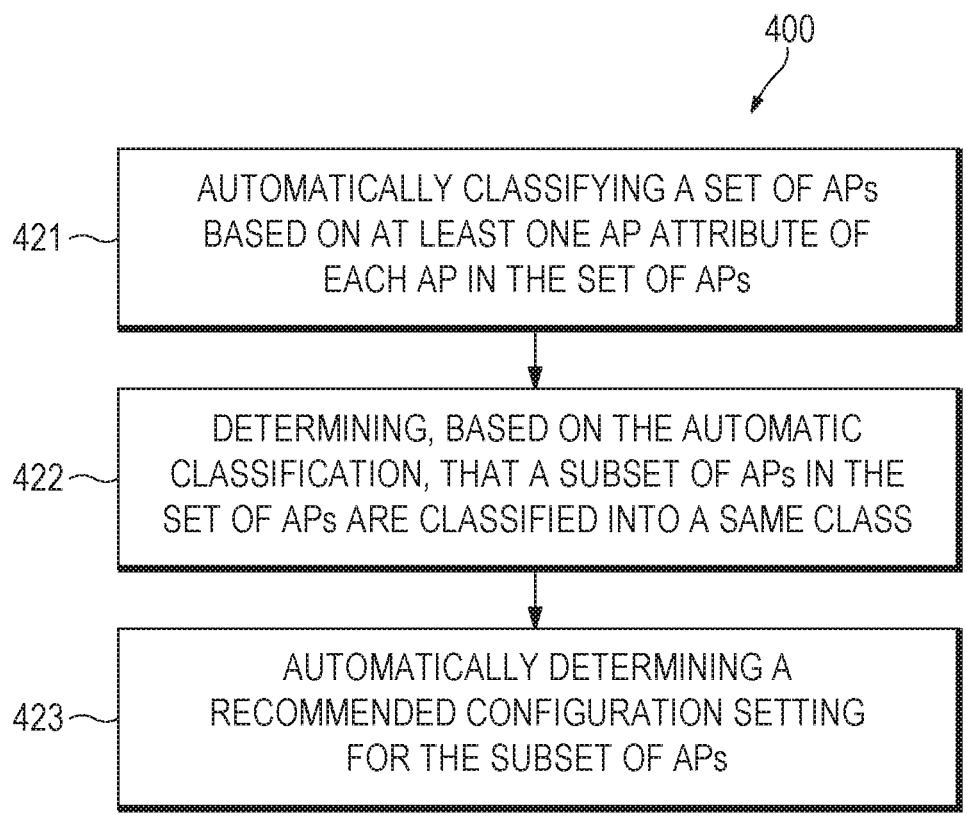
FIG. 4 is a flow diagram depicting an example method for classifying APs.

FIG. 4 is a flow diagram depicting an example method 400 for classifying APs.

The various processing blocks and/or data flows depicted in FIG. 4 (and in the other drawing figures included herein) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 400 as illustrated (and described in greater detail below) is meant to be an example and, as such, should not be viewed as limiting. Method 400 may be implemented in the form of executable instructions stored on a machine-readable storage medium, such as storage medium 310, and/or in the form of electronic circuitry.

In block 421, method 400 may include automatically classifying a set of APs based on at least one AP attribute of each AP in the set of APs. Referring back to FIG. 1, classification engine 121 may be responsible for implementing block 421. AP attribute engine 122 may be responsible for selecting or otherwise identifying the at least one AP attribute to be used in performing block 421.

In block 422, method 400 may include determining, based on the automatic classification, that a subset of APs in the set of APs are classified into a same class. Referring back to FIG. 1, classification engine 121 may be responsible for implementing block 422.

In block 423, method 400 may include automatically determining a recommended configuration setting for the subset of APs. Referring back to FIG. 1, recommendation engine 123 may be responsible for implementing block 423. Performance engine 124 may be responsible for selecting or otherwise identifying at least one performance metric to be used in performing block 423.

FIG. 5 is a table 500 depicting example AP attributes.

FIG. 6 is a site map 600 depicting an example deployment of APs.

FIG. 7 is a site map 700 depicting the example deployment of APs of FIG. 6 by a first AP attribute (e.g., AP density).

FIG. 8 is a site map 800 depicting the example deployment of APs of FIG. 6 by a second AP attribute (e.g., path loss exponent).

FIG. 9 is a site map 900 depicting the example deployment of APs of FIG. 6 by a third AP attribute (e.g., total traffic).

FIG. 10 is a site map 1000 depicting example class labels for APs of FIG. 6.

FIGS. 5-10 are discussed herein with respect to FIG. 1.

The foregoing disclosure describes a number of example implementations for classifying access points (APs). The disclosed examples may include systems, devices, computer-readable storage media, and methods for classifying APs. For purposes of explanation, certain examples are described with reference to the components illustrated in FIGS. 1-3. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for classifying access points (APs), the method comprising:
automatically classifying a set of APs based on an AP attribute of each AP in the set of APs;
determining, based on the automatic classification, that a first subset of APs in the set of APs are classified into a first class;
configuring the first subset of APs with a configuration parameter;
measuring performance of the first subset of APs based on a performance metric of the set of APs;
selecting an AP of the first subset of APs that furthest exceeds the performance metric of the set of APs;

determining, based on the automatic classification, that a second subset of APs in the set of APs are classified into the first class, the second subset comprising one or more APs outside the first subset of APs; and
automatically recommending a recommended configuration parameter for the second subset of APs based on the performance of the selected AP of the first subset of APs, the recommended configuration parameter causing the second subset of APs to perform based on a performance metric associated with the first class.

2. The method of claim 1, comprising:
determining, based on the automatic classification, that a third subset of APs in the set of APs are classified into a second class, wherein the first class represents a first environment and the second class represents a second environment different from the first class.

3. The method of claim 1, wherein automatically classifying the first set of APs based on the AP attribute of each AP comprises: building a classification model based on training data, wherein the training data comprises information related to a training set of APs.

4. The method of claim 3, wherein the information related to the training set of APs comprises information related to the AP attribute of the training set of APs.

5. The method of claim 3, wherein the classification model is built using a clustering technique.

6. The method of claim 3, wherein building the classification model based on the training data comprises:
generating a set of class labels into which the training set of APs are classified, wherein the set of class labels comprises at least the same class as the first and second subset of APs.

7. The method of claim 1, wherein the automatic classification is an iterative process, comprising:
in response to determining that the AP attribute related to an AP in the first set of APs has been updated, automatically re-classifying at least the AP in the first set of APs.

8. The method of claim 1, wherein the automatic classification of the set of APs is based on an environment of the set of APs.

9. The method of claim 8, comprising determining, based on the automatic classification, that the classification of the second subset of APs in the set of APs is changed from the first class to a second class.

10. The method of claim 1, wherein the first class represents an environment in which the first subset of APs is deployed.

11. The method of claim 1, comprising:
changing the configuration of the first subset of APs from the first configuration parameter to a second configuration parameter, wherein the measuring performance of the first subset of APs comprises measuring performance of the first subset of APs configured with the second configuration parameter.

12. A non-transitory machine-readable storage medium comprising instructions executable by a processor of a computing device for classifying access points (APs), the machine-readable storage medium comprising:
instructions to build a classification model that is to classify a set of APs into a set of class labels;
instructions to automatically classify, using the classification model, the set of APs based on at least one AP attribute of each AP in the set of APs;
instructions to determine, based on the automatic classification, that a first subset of APs in the set of APs are classified into a same class;

instructions to configure the first subset of APs with a configuration parameter;
instructions to measure performance of the first subset of APs based on a performance metric of the set of APs;
instructions to select an AP of the first subset of APs that furthest exceeds the performance metric of the set of APs;
instructions to determine, based on the automatic classification, that a second subset of APs in the set of APs are classified into the same class, the second subset comprising one or more APs outside the first subset of APs; and
instructions to automatically recommend a recommended configuration parameter for the second subset of APs based on the performance of the selected AP of the first subset of APs, the recommended configuration parameter causing the second subset of APs to perform based on a performance metric associated with the first class.

13. The non-transitory machine-readable storage medium of claim 12, comprising:
instructions to determine, based on the automatic classification, that a third subset of APs in the set of APs are classified into a different class, wherein the same class represents a first environment and the different class represents a second different environment.

14. The non-transitory machine-readable storage medium of claim 12, wherein the automatic classification is an iterative process, comprising:
in response to determining that the AP attribute related to an AP in the first set of APs has been updated, instructions to automatically re-classify at least the AP in the first set of APs.

15. The non-transitory machine-readable storage medium of claim 12, wherein the automatic classification of the set of APs is based on an environment of the set of APs.

16. The non-transitory machine-readable storage medium of claim 12, comprising instructions to determine, based on the automatic classification, that the classification of the second subset of APs in the set of APs is changed from the same class to a second class.

17. The non-transitory machine-readable storage medium of claim 12, wherein the same class represents an environment in which the first subset of APs is deployed.

18. A system comprising:
a server computing device to:
build a classification model that is to classify a set of access points (APs) into a set of class labels;
automatically classify, using the classification model, the set of APs based on at least one AP attribute of each AP in the set of APs;
determine, based on the automatic classification, that a first subset of APs in the set of APs are classified into a same class, wherein the first subset of APs comprises a first AP;
configure the first subset of APs with a configuration parameter;
measure performance of the first subset of APs based on a performance metric of the set of APs;
select an AP of the first subset of APs that furthest exceeds the performance metric of the set of APs;
determine, based on the automatic classification, that a second subset of APs in the set of APs are classified into the same class, the second subset comprising one or more APs outside the first subset of APs; and
automatically recommend a recommended configuration parameter for the second subset of APs based on the performance of the selected AP of the first subset of APs, the recommended configuration parameter causing the second subset of APs to perform based on a performance metric associated with the first class.

19. The system of claim 18, wherein the same class represents an environment in which the first subset of APs is deployed.

20. The system of claim 18, wherein the automatic classification is an iterative process, comprising:
   in response to determining that the AP attribute related to an AP in the first set of APs has been updated, instructions to automatically re-classify at least the AP in the first set of APs.

\* \* \* \* \*